US010235762B1

(12) United States Patent
Wylie et al.

(10) Patent No.: US 10,235,762 B1
(45) Date of Patent: Mar. 19, 2019

(54) ASSET TRACKING SYSTEMS

(71) Applicant: Capital One Services, LLC, McLean, VA (US)

(72) Inventors: Stephen Michael Wylie, Carrollton, TX (US); Jason Richard Hoover, Grapevine, TX (US); Geoffrey Dagley, McKinney, TX (US); Micah Price, Plano, TX (US); Qiaochu Tang, The Colony, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/128,682

(22) Filed: Sep. 12, 2018

(51) Int. Cl.
*G06T 7/20* (2017.01)
*G06T 7/70* (2017.01)
*G06K 9/62* (2006.01)
*G01S 19/13* (2010.01)
*G06K 9/00* (2006.01)

(52) U.S. Cl.
CPC ............... *G06T 7/20* (2013.01); *G01S 19/13* (2013.01); *G06K 9/00771* (2013.01); *G06K 9/628* (2013.01); *G06K 9/6268* (2013.01); *G06T 7/70* (2017.01); *G06T 2207/20081* (2013.01); *G06T 2207/20084* (2013.01); *G06T 2207/30232* (2013.01)

(58) Field of Classification Search
CPC ........................................ G06T 7/20

USPC .......................................................... 382/103
See application file for complete search history.

(56) References Cited

U.S. PATENT DOCUMENTS

| 9,664,510 | B2* | 5/2017 | Nathan | ................. | G06Q 10/08 |
| 2014/0028447 | A1* | 1/2014 | Howard | ............... | G06Q 10/087 |
| | | | | | 340/10.6 |
| 2014/0074667 | A1* | 3/2014 | Smith | ...................... | G01S 5/12 |
| | | | | | 705/28 |

* cited by examiner

*Primary Examiner* — Gregory F Cunningham
(74) *Attorney, Agent, or Firm* — Troutman Sanders LLP; Christopher J. Forstner; John A. Morrissett (57) ABSTRACT

The disclosed technology includes image-based systems and methods for object tracking within an asset area. Some exemplary methods include receiving, from an ingress detector, an ingress indication of a first object entering an asset area and receiving, from one or more image capture devices positioned to view respective portions of the asset area, data indicative of a plurality of captured images. The methods also include performing, by at least one processor, object classification of the first object based on the ingress indication, one or more of at least one of the plurality of captured images, and an identification signal detected by the ingress detector. The methods further include determining a first object location of the first object based at least in part on the object classification and outputting an indication of the first object location.

20 Claims, 5 Drawing Sheets

ASSET TRACKING SYSTEMS

FIELD

The present disclosure generally relates to the field of asset tracking and, more particularly, to monitoring asset location with a computer vision system.

BACKGROUND

Computer vision is a term that can be used to describe hardware and software technology utilized in object and/or pattern recognition. To expedite processing times and decrease operation costs, many computer vision systems have been automated for particular applications. For example, some computer visions systems include software-implemented character recognition features for extracting and converting printed text to a digital format. Other computer vision systems have been developed to automatically inspect industrial products for defects. Yet other computer vision systems have been developed to recognize human faces.

Various approaches have been applied to improve object tracking using computer vision in which patterns and features are analyzed to detect movement of objects. However, distinguishing among objects for individual object tracking can be particularly challenging when the view of object of interest is obstructed, or when similarly-shaped objects are in the field of view. Accordingly, there is a need for improved accuracy in asset tracking using computer vision systems. Embodiments of the present disclosure are directed to this and other considerations.

BRIEF SUMMARY

The disclosed technology includes image-based systems and methods for tracking assets (such as vehicles) within an asset area (such as a car dealership lot). Certain example implementations of the disclosed technology utilize one or more image capture devices positioned to view respective portions of the asset area. An ingress detector positioned, for example, at an entrance to the asset area may provide an indication that an object has entered the asset area, and the position of the asset may then be monitored by a computer vision system based on image data received from the one or more image capture devices. In certain example implementations, the ingress detector may be used to identify the asset if it has previously been identified and marked with a readable identifier, such as a barcode, RFID tag, etc. Certain example implementations of the disclosed technology may include a registration station that may identify and tag new assets entering the asset area.

In an example implementation, one or more processors associated with the computer vision system may receive the ingress indication either from the ingress detector or from the registration station and classify the object using one or more of: image data received from the one or more image capture devices and an identification signal detected by the ingress detector. In accordance with certain example implementations of the disclosed technology, the system may track the object location and may output an indication of the object location. The classification and/or recognition of the object may be based on one or more images to enhance the object tracking, for example, so that a particular object can be accurately tracked when other similarly-shaped objects are moved or present, and/or when similarly-shaped objects temporarily or partially obscure the view of the tracked object.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and which are incorporated into and constitute a portion of this disclosure, illustrate various implementations and aspects of the disclosed technology and, together with the description, serve to explain the principles of the disclosed technology.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The term "computer vision" as used herein may be equivalent to the term "machine vision," which traditionally refers to using computer vision in an industrial or practical application.

The disclosed technology includes image-based systems and methods for object tracking within an asset area. In certain example implementations, a system is provided that includes one or more image capture devices positioned to view respective portions of the asset area. The system also includes an ingress detector, at least one processor in communication with the one or more image capture devices and the ingress detector, and a memory in communication with the at least one processor and storing instructions that, when executed by the at least one processor, are configured to cause the at least one processor to perform one or more steps of a method. The method may include receiving, from the ingress detector, an ingress indication of a first object entering the asset area and receiving, from at least one of the one or more image capture devices, data indicative of a plurality of captured images. The method may also include classifying, responsive to the ingress indication, the first object as having a first classification of a plurality of classifications using one or more of at least one of the plurality of captured images and an identification signal detected by the ingress detector. Based on the first classification, the system may track a first object location of the first object and output, based on the first classification, an indication of the first object location.

In accordance with certain example implementations of the disclosed technology, a method is provided that can include receiving, from an ingress detector, an ingress indication of a first object entering an asset area and receiving, from one or more image capture devices positioned to view respective portions of the asset area, data indicative of a plurality of captured images. The method may also include performing, by at least one processor, object classification of the first object based on the ingress indication, one or more of at least one of the plurality of captured images, and an identification signal detected by the ingress detector. The method may further include determining a first object location of the first object based at least in part on the object classification; and outputting an indication of the first object location.

The disclosed technology further provides a non-transitory computer readable storage medium storing instructions for use with an image-based object tracking system. The instructions are configured to cause the system to perform one or more steps of a method. The method may include receiving, from an ingress detector, an ingress indication of a first object entering an asset area and receiving, from one or more image capture devices positioned to view respective portions of the asset area, data indicative of a plurality of captured images. The method may also include performing, by at least one processor, object classification of the first object based on the ingress indication, one or more of at least one of the plurality of captured images, and an identification signal detected by the ingress detector. The method may further include determining a first object location of the first object based at least in part on the object classification and outputting an indication of the first object location.

Figure 1:
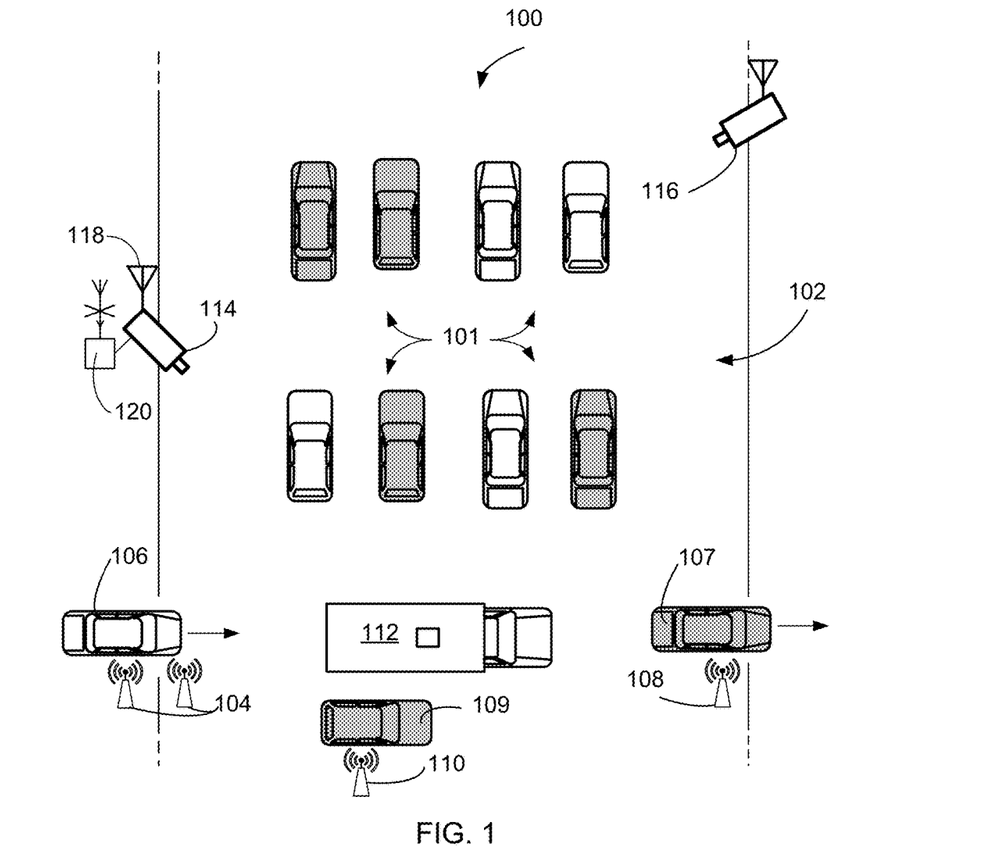
FIG. 1 depicts an overhead view of an asset area in which image capture devices are being utilized to monitor locations of assets, according to an example implementation of the disclosed technology.

FIG. 1 depicts an example scenario 100 in which a defined asset area 102 is utilized to store assets 101. As illustrated in the example scenario 100, the asset area 102 could be a car dealership lot and the assets 101 could be vehicles. It should be appreciated that the disclosed technology may be applied to many other tracking applications and is not limited to vehicle tracking, as illustrated in the example use case scenario 100. According to an example implementation of the disclosed technology, the asset area 102 may include an ingress region having one or more ingress detectors 104 suitable for detecting when an asset 106 is entering the asset area 102. Likewise, the asset area 102 may include an egress region having one or more egress detectors 108 configured to detect when an asset 107 is leaving the asset area 102. The ingress region and/or the egress region may include multiple detectors, for example, that may detect the direction of movement of the asset so that it can be positively determined if it is entering or leaving the asset area 102, regardless of adherence (or lack thereof) to the designation of entrances or exits.

In accordance with certain example implementations of the disclosed technology, the ingress detectors 104 may be configured to determine that an object (such as the vehicle 106) is entering the asset area 102. One or more sensors associated with the ingress detectors 104 may be utilized to read, scan, or otherwise detect a previously attached identifier (such as a barcode, QR code, RFID tag, BLE beacon, etc.) so that the entering asset 106 can be positively identified and distinguished from the other assets.

In certain example implementations, once the entering asset 106 has been identified as an asset for which position tracking is desired, the identifier information read by the ingress detectors 104 may be fed to an asset location server including a computer vision system (as will be discussed with reference to FIG. 2) to initiate tracking of the asset 106. In accordance with certain example implementations of the disclosed technology, the ingress detectors 104 and/or the egress detectors 108 may be in communication with the computer vision system by one or more wired or wireless networks, such as via an access point 120.

In accordance with certain example implementations of the disclosed technology, one or more image capture devices 114, 116 (such as cameras) may be positioned and secured in-place to view respective portions of the asset area 102 and may be configured to send image information to one or more processors of the computer vision system. In certain example implementations, the image capture devices 114, 116 may be configured to capture video. In certain example implementations, the image capture devices 114, 116 may be configured to capture a series of images, such as a burst of image frames. The one or more image capture devices 114, 116 may include a GPS receiver that may be utilized to establish the position of the image capture device so that relative movements of the assets in view of the image capture devices 114, 116 can be determined (for example, by image processing techniques) and referenced to the known position for providing detailed positioning information of the tracked asset.

In accordance with certain example implementations of the disclosed technology, one or more movement detectors may be utilized to detect object movement within the asset area 102 and to provide a "wake-up" signal to the one or more image capture devices 114, 116 and/or the computer vision system so that the image capture and/or image processing can be initiated when movement is detected. According to an example implementation of the disclosed technology, the ingress detectors 104 may be utilized to provide a "wake-up" signal when an object is detected entering the asset area 102.

In certain example implementations, the image capture devices 114, 116 may be configured to send the captured image information to a network in communication with the computer vision system via an access point 120 via wired connections or wireless channels 118.

According to certain example implementations of the disclosed technology, object (asset) detection and tracking may utilize predictions including, but not limited to: classification of what the object is; and the location of that object in a frame. For example, the frame may be defined by a set of (x, y) coordinates that make a bounding box around the object. In certain example implementations, the classification of the object may be based on classification scores.

In accordance with certain example implementations of the disclosed technology, once the object has been classified with high confidence, an associated bounding box may be utilized to track the object. The tracking of a bounding box may be less computationally intensive than other techniques, for example, that rely feature extraction or continuous identification of the object. Certain example implementations of the disclosed technology may utilize centroid tracking to track the object. In certain example implementations of the disclosed technology the bounding box approach may be utilized as starting point for tracking the object, and a more computationally intensive (and more accurate) computer vision method may be utilized to track the object when appropriate. In certain example implementations of the disclosed technology classification scores may be accumulated over multiple frames to arrive at a best guess of the class of the object, and a bounding box keyed on the final frame may be utilized to start tracking the object.

The image capture devices 114, 116 may capture image frames of the asset (such as the vehicle 106) while the asset moves around and within the monitored the asset area 102, such that certain features of the asset may be more pronounced in some frames, while less pronounced in other frames. According to certain example implementations of the disclosed technology, a classification engine running on the computer vision system may be trained to distinguish among different objects based on certain features including, but not limited to color, shape, size, and other distinguishing features. For example, in the case where the asset is a vehicle, the front right-side blinker lens of the vehicle may be viewable in the initial image frame but not in a subsequent image frame. Certain views of the asset may include unique feature information that can be extracted and utilized by the classification engine to provide a score representative of a confidence or probability that the particular view of the asset matches with a corresponding representation of an object in a trained computer vision model. This feature of the disclosed technology may allow the computer vision system to distinguish between different makes and models of assets and may enhance the ability to accurately track an asset's location even in the presence of other similarly shaped assets. For example, based on the classifications, the classification engine may be able to distinguish between a passenger vehicle 106 and a delivery truck 112 or other models of passenger vehicles 101 within the asset area 102.

In accordance with certain example implementations of the disclosed technology, the object (asset) detection may include a keypoint detection and/or feature extraction techniques such as Histogram of Oriented Gradients (HOG) or Haar-like features, which may be fed into a classifier such as a Support Vector Machine, Logistic Regression, or cascade classifier. Certain example implementations of the disclosed technology may utilize a convolutional neural net (CNN) architecture, for example, which may classify the object directly from image pixel data. For image recognition, certain example implementations of the disclosed technology may utilize, state-of-the-art architectures such as VGG, ResNet, and/or Inception.

With continued reference to FIG. 1, and in accordance with certain example implementations of the disclosed technology, a "potential" new asset may enter the asset area 102, for example, via the ingress point, but may not have been previously tagged and entered into the system. In this situation, the ingress detectors 104 may detect an entering object having no identification tagging. An indicator (such as a sign) and/or an additional controlled access gate may be used to notify personnel to direct the potential asset 109 to a registration station 110 for asset tagging, identification, and/or registration. In accordance with certain example implementations of the disclosed technology, and responsive to the new asset 109 being tagged (for example, with a barcode, QR code, RFID tag, Bluetooth Low Energy (BLE) beacon, etc.), the tracking of the new asset 109 with the one or more image capture devices 114, 116 and the computer vision system may be initiated.

According to an example implementation of the disclosed technology, the ingress detectors 104 may detect an entering object (such as a temporary visitor) having no identification tagging and may initiate camera tracking on such objects. In an example implantation, the registration station 110 may be used to register individuals wandering through the dealership lot so their positions can be tracked by the dealership. In certain example implementations, multiple ingress-egress points may be established within the asset area 102 to aid tracking, for example, when a vehicle goes through a car wash or other service bay.

Figure 2:
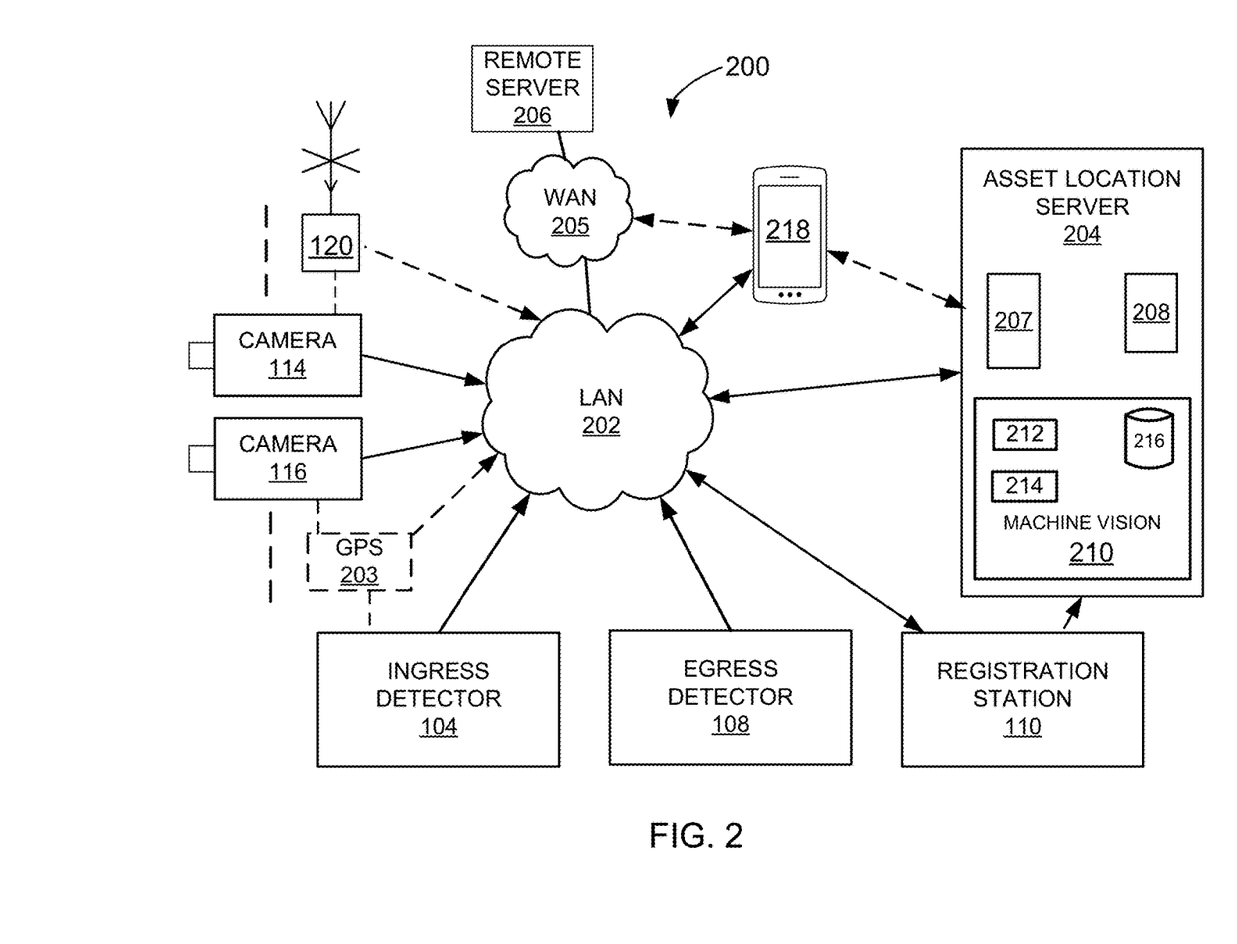
FIG. 2 depicts an example block diagram of an asset tracking system, according to an example implementation of the disclosed technology.

FIG. 2 depicts an example block diagram of an asset tracking system 200, according to an example implementation of the disclosed technology. Certain example implementations of the disclosed technology may include a wired and/or wireless local area network (LAN) 202 in communication with one or more of the components as discussed above with reference to FIG. 1 including, but not limited to the ingress detector(s) 104, the egress detector(s) 108, the registration station 110, and/or the image capture devices 114, 116. In certain example implementations, the access point 120 may provide wireless communication channels for the various components of the system 200 and may be in communication with the LAN 202. In certain example implementations, a GPS 203 may be co-located with one or more of the image capture devices 114, 116 and/or the ingress detector 104, and may provide absolute position information to the asset tracking system 200.

According to another example implementation of the disclosed technology, a modular (or temporary) GPS receiver may be utilized during system setup, for example, to take initial GPS positional measurements. In certain example implementations, once the initial positions of the image capture devices 114, 116 are determined, public infrastructure (e.g. CORS data from NGS) may be utilized to reduce GPS drift error if the stations are fixed/immovable. In this implementation, the cost of a GPS sensor in the system may be eliminated.

In certain example implementations of the disclosed technology, the LAN 202 may be in communication with an asset location server 204 having a computer vision component 210, as will be explained in detail below. In certain example implementations of the disclosed technology, the LAN 202 may also be in communication with a remote server 206 via a wide area network (WAN) 205 such as via the Internet. The remote server 206, for example, may provide additional processing, inventory control, software updates, computer vision models, etc., for use with the asset location server 204.

Certain example implementations of the disclosed technology may be configured to provide asset location information to a mobile computing device 218, for example, so that a particular asset may be easily located, and/or so that assets located within a predetermined range of the mobile computing device 218 may be easily identified. A customer shopping for a vehicle, for example, may utilize their mobile computing device 218 to interact with the asset location server (via the LAN 202, WAN 205, access point 120, etc.) and receive vehicle location information and/or directions based on known coordinates of the vehicle position and GPS coordinates determined by the mobile computing device 218.

In accordance with certain example implementations of the disclosed technology, the asset location server 204 may include one or more processors 207 (and additional components as will be discussed below with reference to FIG. 3) and memory 208 storing instructions that cause the one or more processors 207 to perform various functions that enable tracking of assets. In certain example implementations, the asset location server 204 may include a computer vision component 210 configured to process images received from the image capture devices 114, 116. For example, the computer vision component 210 may include one or more special purpose modules, including but not limited to a trained neural network and/or artificial intelligence module 212. In an example implementation, the computer vision component 210 may include a classification module 214 in communication with memory storing asset models 216 corresponding to the assets.

The classification module 214 may be trained to recognize and distinguish different assets (vehicles for example) for utilization by the computer vision module 210. In an example implementation, image frames received from one or more of the image capture devices 114, 116 may represent different perspective view of the vehicle. In certain example implementations, the different perspective views of the vehicle may be the result of the vehicle being moved around an asset area (such as the asset area 102 as depicted in FIG. 1). Classification scores may be generated by the classification module 214 responsive to matching of a portion of the received image frames with stored asset models 216 via the trained neural network 212, with the higher score indicating a better match for a particular make/year/model of vehicle.

In accordance with certain example implementations of the disclosed technology, classifying a specific make/year/model may not be strictly necessary for tracking the vehicle. For example, a certain classifier may be utilized to only track generic 'car' or 'truck' classes (instead of specific make/models). In this example implementation, a bounding box may be compared across multiple frames to track the location of an identified vehicle. For example, an asset may be initially 'tagged' (as a specific make/model/year/VIN), and subsequent positional tracking of the associated bounding box across frames may be utilized to effectively track the identified vehicle. In certain example implementations, the object detection model may be configured to detect components such as a 'headlight', 'window', 'trim', etc., as well as the generic 'car' classification, which may provide for more robust tracking of the asset from frame to frame when parts of the car are obscured. Furthermore, multiple cameras may be utilized to mitigate losing track of the vehicle if it becomes hidden from view from one camera. In certain example implementations, the velocity and/or acceleration of an object may be tracked over multiple frames to estimate its future position.

In accordance with certain example implementations of the disclosed technology, the 'tagging' and 'tracking' may involve different steps and/or processes. For example, an object may be tagged as part of an initial process and scanned upon entering or exiting an egress area, but a separate object detection model trained generically on 'car' and/or associated identifiable features may be used to keep track of the location of the object(s). In certain example implementations, the cameras may be utilized to periodically verify the accuracy of the tag information, so that a mis-tagged vehicle may be identified, re-tagged, and/or have its associated identification information corrected.

According to an example implementation of the disclosed technology, as the different views of the asset are processed, distinguishing features may be utilized to provide a more accurate classification score. For example, distinguishing features for a vehicle can include shapes and/or relative placement of one or more of: windows, bumpers, trim, lights, blinkers, lenses, panels, logos, rims, antenna, windshield features, doors, grill, accessory racks, etc.

In certain example implementations, a threshold score may be utilized, for example, to terminate all or a part of the asset recognition process when one of the accumulated classification counts exceeds the threshold, indicating a positive identification of a particular asset. In certain example implementations, after an asset has been identified with high confidence, the asset may be tracked using a less computationally intensive processes, such as centroid tracking. In certain example implementations of the disclosed technology the threshold may be dynamically adjusted based on one or more of: a percentage of accumulated classification counts; one or more differences between accumulated classification counts for the various assets, and a minimum value. In accordance with certain example implementations of the disclosed technology, if a minimum classification value is not achieved for any of the accumulated values within a specified time, the system may terminate the recognition process, and the model having the highest accumulated classification counts may be identified, and/or an indication may be output indicating insufficient recognition of the object. In certain example implementations of the disclosed technology, if a minimum classification value is not achieved, a set of the most likely matching objects may be output with an indication that insufficient certainty was achieved.

In another example implementation of the disclosed technology, an accumulation of classification counts may be utilized to enhance object recognition based on image characteristics and variations (besides or in addition to different perspectives). For example, one or more image characteristics including but not limited to: brightness, contrast, focus, sharpness, color, tint, noise, etc., may contribute to variations among the image frames, and such variable image characteristics may be utilized by the disclosed technology to enhance object recognition.

Certain example implementations of the disclosed technology may utilize location information (such as GPS coordinates, geofencing, etc.) to provide enhancements to the process of asset recognition and/or tracking. For example, a GPS receiver on the user's mobile computing device 218 may be utilized to determine an approximate location for which nearby assets may be identified. In one example scenario, a user may be walking around a car dealership lot. In certain example implementations, the user's mobile computing device 218 may access and utilize data from an inventory management system and may use the location information to filter and/or exclude vehicles based on location, for example, to exclude vehicles that are not expected to be present at or near that location. In another example scenario, location information from the user device 218 may be utilized to indicate a subset of vehicles that are likely to be nearby based on the location data. In certain example implementations of the disclosed technology, signage, QR codes, barcodes, emblems, and/or other identifying features near or attached to the vehicle may be utilized to enhance the location information.

In accordance with an example implementation of the disclosed technology, one or more image capture devices 114, 116 may output image data that may undergo further image processing, for example, by the computer vision module 210, such as normalization, edge detection, noise reduction, sharpening, brightness adjustment, contrast adjustment, color adjustment, etc.

Figure 3:
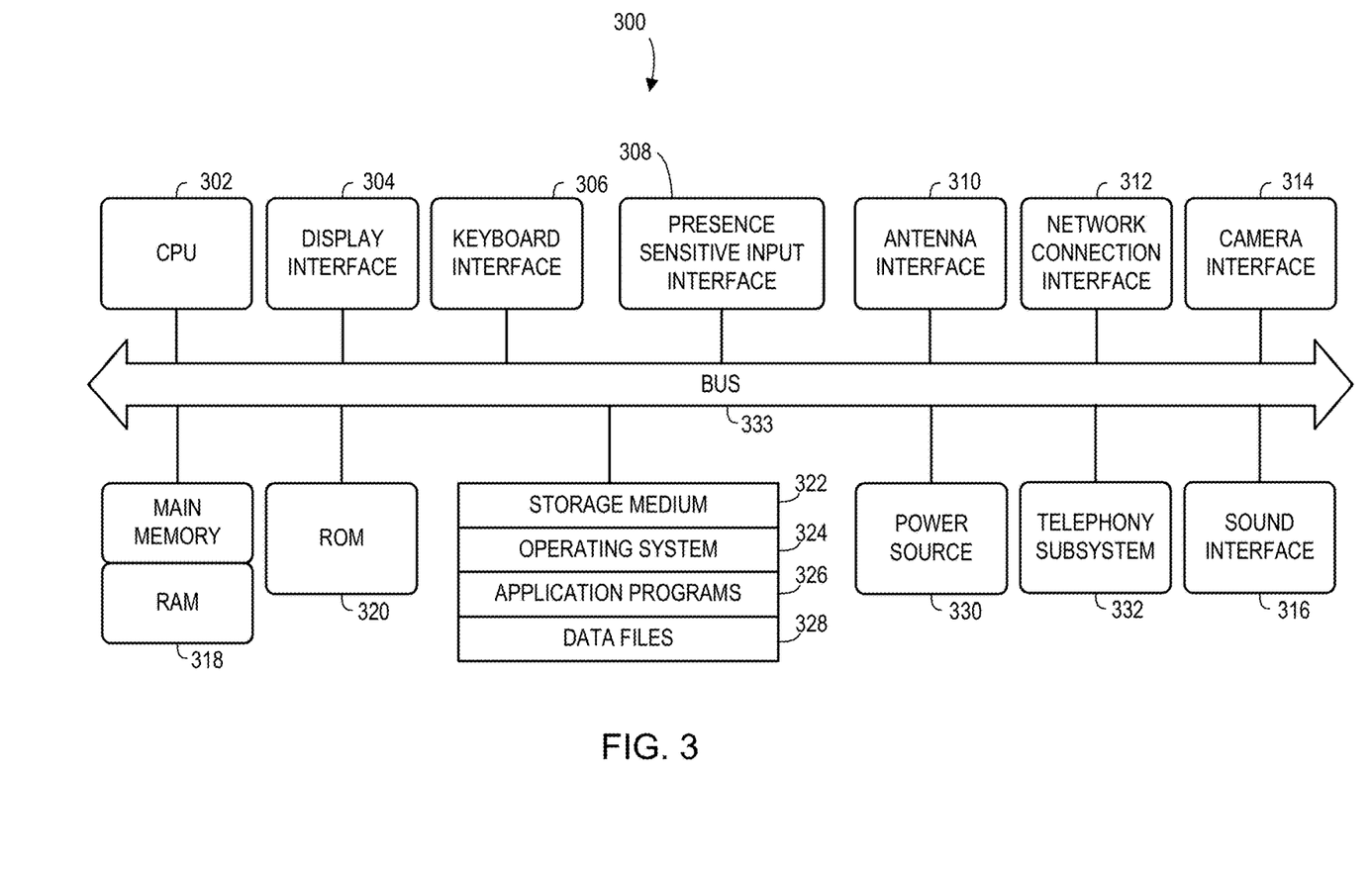
FIG. 3 is a block diagram of an illustrative computing device, according to an example implementation of the disclosed technology.

FIG. 3 depicts a block diagram of an illustrative computing device 300 according to an example implementation. Certain aspects of FIG. 3 may be embodied in the asset location server 204 as discussed above with respect to FIG. 2. According to one example implementation, the term "computing device," as used herein, may be a CPU, or conceptualized as a CPU (for example, the CPU 302 of FIG. 3). In this example implementation, the computing device (CPU) may be coupled, connected, and/or in communication with a network via communication channels including, but not limited to Internet connections, satellite communications, wireless channels, cloud connections, etc.

In an example implementation, the computing device 300 may output content to its local display and may transmit and receive messages via the antenna interface 310, the network connection interface 312, telephony subsystem 332, etc. The computing device may output content to an external display device (e.g., over Wi-Fi) such as a TV or an external computing system. It will be understood that the computing device 300 is provided for example purposes only and does not limit the scope of the various implementations of the communication systems and methods.

The computing device 300 of FIG. 3 includes a central processing module (CPU) 302, where computer instructions are processed. Certain example implementations can include a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured to provide content (for example, data, images, location data, and other information as previously discussed) for an external/remote display or mobile computing device that is not necessarily physically connected to the computing device 300. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to an external/remote display.

The network connection interface 312 may be configured as a communication interface and may provide functions for rendering video, graphics, images, text, other information, or any combination thereof on the display. In one example, the computing device 300 may include a communication interface that may include one or more of: a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 300 may include a keyboard interface 306 that provides a communication interface to a keyboard. In one example implementation, the computing device 300 may include a pointing device interface 308 for connecting to a presence-sensitive input interface. The pointing device interface 308 may provide a communication interface to various devices such as video cameras, ingress/egress sensors, etc.

The computing device 300 may be configured to use an input device via one or more of input/output interfaces (for example, the keyboard interface 306, the display interface 304, the pointing device interface 308, the antenna interface 310, the network connection interface 312, camera interface 314, sound interface 316, etc.) to allow a user to capture information into the computing device 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 300 or may be a separate device. For example, the input device may be an accelerometer, a magnetometer, a digital camera, a microphone, and an optical sensor.

Certain example implementations of the computing device 300 may include an antenna interface 310 in communication with an antenna. The antenna interface 310 can include one or more of: a receiver, analog-to-digital converter, sampler, buffers, and memory. Certain example implementations can include a network connection interface 312 that provides a communication interface to a network.

In certain implementations, a camera interface 314 may act as a communication interface to provide functions for capturing digital images (and/or video) from a camera. In certain example implementations, the camera interface 314 may be utilized to control certain characteristics of the camera, such as focus, aperture, exposure time, burst rate, etc.

In certain implementations, a sound interface 316 is provided as a communication interface for converting sound into electrical signals using a microphone and for converting electrical signals into sound using a speaker. According to example implementations, a random-access memory (RAM) 318 is provided, where computer instructions and data may be stored in a volatile memory device for processing by the CPU 302. In certain example implementations, the sound interface may be utilized to receive audible signals, for example, due to an object entering an asset area. In such embodiments, a received audible signal having a signal strength above a predetermined threshold may serve as a "wake-up" signal, as previously discussed.

According to an example implementation, the computing device 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 and content files 328 are stored.

In accordance with certain example implementations of the disclosed technology, the application programs 326 can include special-purpose software that may perform one or more of the following functions: receive images via the camera interface, process images, process location data, classify images according to trained computer vision models, etc.

According to an example implementation, the computing device 300 includes a power source 330 that provides an appropriate alternating current (AC) or direct current (DC) to power components. According to an example implementation, the computing device 300 can include a telephony subsystem 332 that allows the device 300 to transmit and receive sound over a telephone network. The constituent devices and the CPU 302 communicate with each other over a bus 334.

In accordance with an example implementation, the CPU 302 has appropriate structure to be a computer processor. In one arrangement, the computer CPU 302 may include more than one processing module. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Content may be stored in the RAM 318, where the content may be accessed by the computer CPU 302 during execution. In one example configuration, the device 300 includes at least 128 MB of RAM, and 256 MB of flash memory.

The storage medium 322 itself may include a number of physical drive modules, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

According to one example implementation, the terms computing device or mobile computing device, as used herein, may be a central processing module (CPU), controller or processor, or may be conceptualized as a CPU, controller or processor (for example, the CPU processor 302 of FIG. 3). In yet other instances, a computing device may be a CPU, controller or processor combined with one or more additional hardware components. In certain example implementations, the computing device operating as a CPU, controller or processor may be operatively coupled with one or more peripheral devices, such as a display, navigation system, stereo, entertainment center, Wi-Fi access point, or the like. In another example implementation, the term computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, satellite processor, or some other like terminology. In an example embodiment, the computing device may output content to its local display or speaker(s). In another example implementation, the computing device may output content to an external display device (e.g., over Wi-Fi) such as a TV or an external computing system.

The features and other aspects and principles of the disclosed embodiments may be implemented in various environments. Such environments and related applications may be specifically constructed for performing the various processes and operations of the disclosed embodiments or they may include a special-purpose computer or computing platform selectively activated or reconfigured by program code to provide the necessary functionality. Further, the processes disclosed herein may be implemented by a suitable combination of hardware, software, and/or firmware. For example, the disclosed embodiments may implement computing machines configured to execute software programs that perform processes consistent with the disclosed embodiments. Certain disclosed embodiments may implement a specialized apparatus or system configured to execute software programs that perform processes consistent with the disclosed embodiments. Furthermore, although some disclosed embodiments may be implemented by general-purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high-level and/or low-level software instructions, such as machine code (e.g., such as that produced by a compiler) and/or high-level code that can be executed by a processor using an interpreter.

Figure 4:
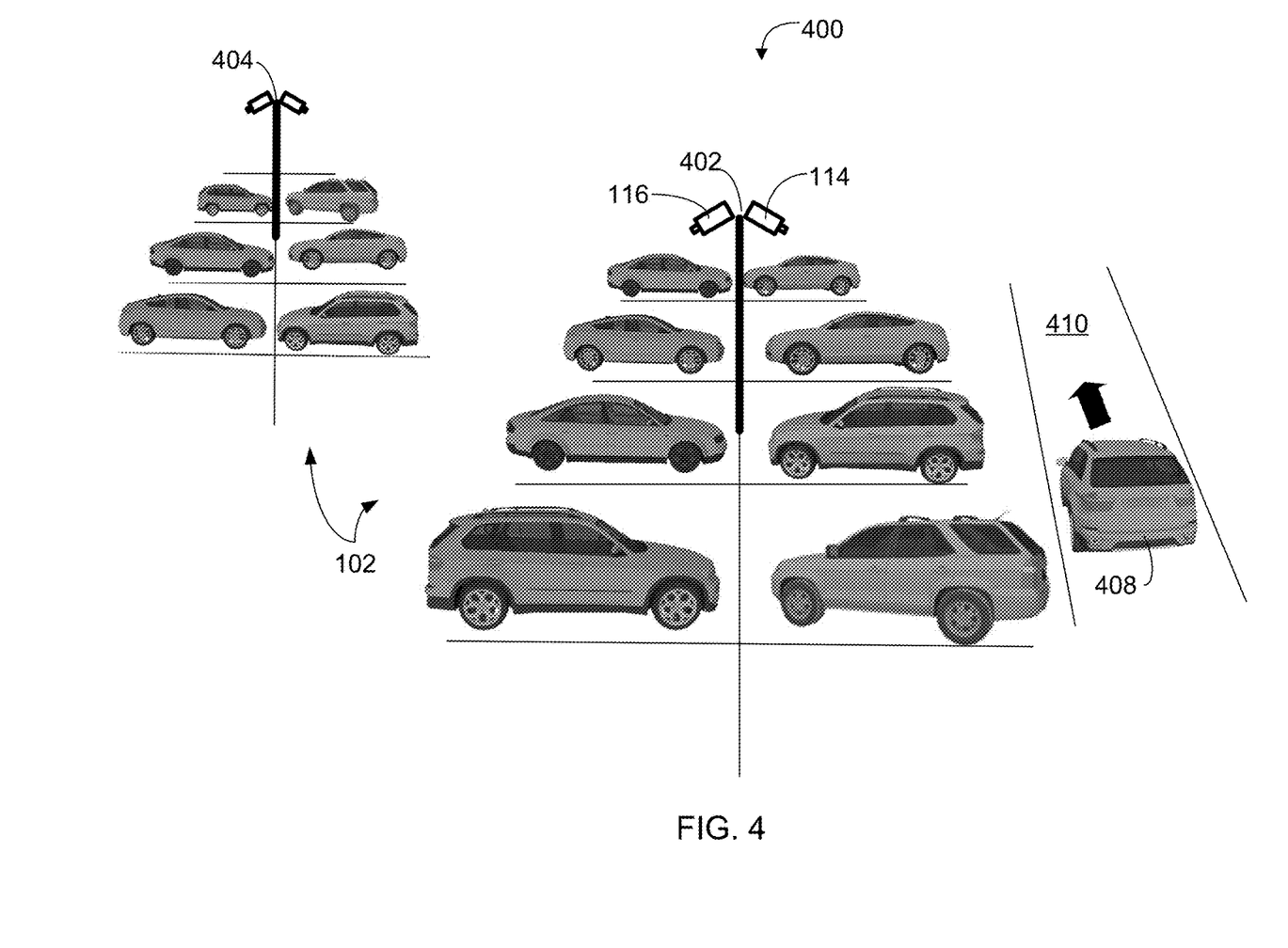
FIG. 4 depicts an overhead side view of an asset area using the asset tracking system, according to an example implementation of the disclosed technology.

FIG. 4 illustrates an example setting 400 for use of the asset tracking system (e.g., asset tracking system 200), according to an example implementation of the disclosed technology. As depicted in FIG. 4, one or more asset areas 102 may be monitored using one or more image capture devices 114, 116 (as previously discussed). In this example implementation, the image capture devices 114, 116 may be elevated by and mounted on respective poles 402, 404 so that a clear view is provided to the respective asset areas 102 including travel paths 410 for which assets 408 may be tracked during movement and/or stored in respective storage areas (such as parking spots). In accordance with certain example implementations of the disclosed technology, the one or more image capture devices 114, 116 may be retrofit on existing structures, such as lighting poles, nearby buildings, etc., to reduce installation expenses. According to an example implementation of the disclosed technology, indicia designations (such as parking spot lines, numbers, etc.,) may be utilized by the asset tracking system to determine the location of the asset.

In addition to the asset tracking functions, as provided by certain example implementations disclosed herein, the one or more image capture devices 114, 116 (in conjunction one or more of the components as previously described with reference to FIG. 2 and FIG. 3) may provide additional security system functions, for example, to monitor the asset area(s) 102, record video, detect intruders, turn on lights when movement is detected at night, etc.

In an example implementation, the asset tracking system(s), as disclosed herein, may be utilized to document a condition of an asset at a first time and a second time, for example, to provide a time-stamped record of when damage may have occurred. For example, a customer may damage a vehicle during a test drive and attempt to claim that the damage was already present on the vehicle before the test drive. Saved images or video may provide proof of the before- and after-condition of the asset. In another example implementation, the systems and methods provided herein may be utilized in car rental facilities to enable tracking of vehicles to provide a record of the vehicle condition at the start and end of a rental period.

Figure 5:
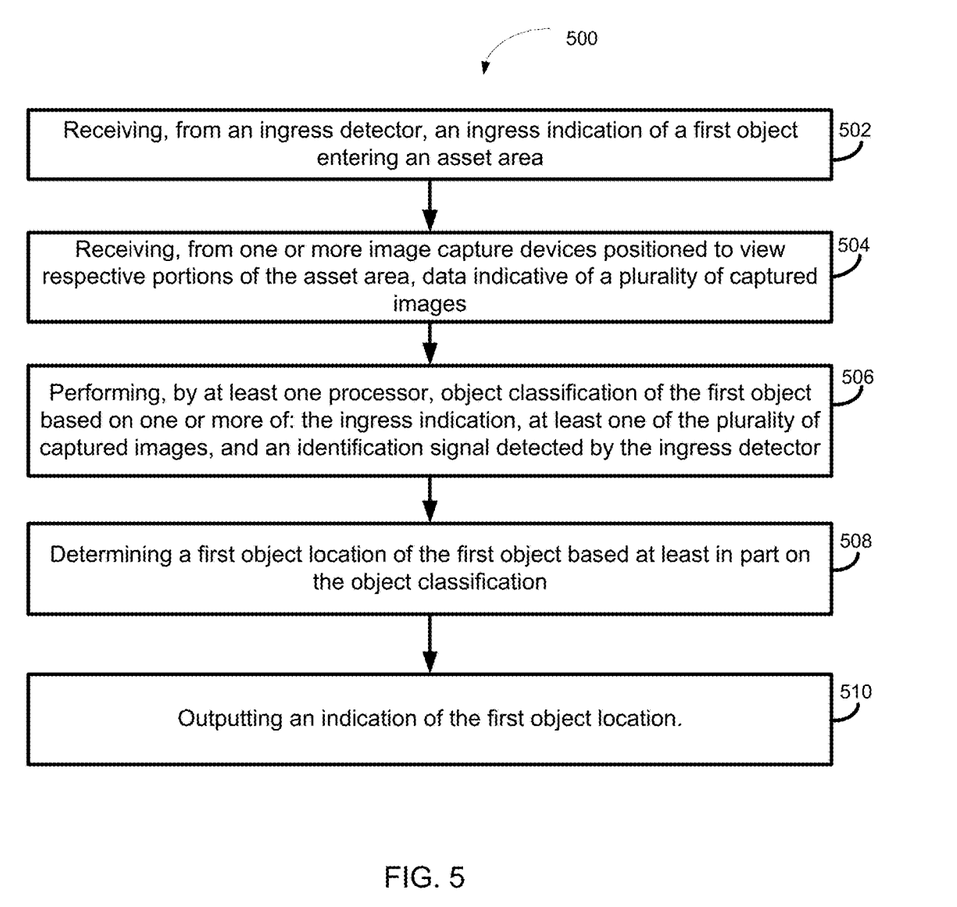
FIG. 5 is a flow diagram of a method, according to an example implementation of the disclosed technology.

FIG. 5 is a flow diagram of a method 500 according to an example implementation of the disclosed technology. In block 502, the method 500 includes receiving, from an ingress detector, an ingress indication of a first object entering an asset area. For example, and with reference to FIG. 1, a vehicle 106 may enter the asset area through a dedicated entrance in which one or more ingress detectors 104 may be utilized to detect the entering vehicle 106. For example, a vehicle 106 entering the asset area may have been previously equipped with identifying means, such as a RFID tag, QR code, barcode, Bluetooth Low Energy (BLE) beacon, etc., that may be read by the ingress detector 104. In certain example implementations, the one or more ingress detectors 104 may be utilized to positively identify the entering vehicle 106, and such information may be utilized to associate and track (via images received from the one or more image capture devices 114, 116) the entering and identified vehicle 106 as it traverses within the asset area 102.

In other example implementations, the one or more ingress detectors 104 may sense an object entering the asset area without specifically identifying the object. For example, a new vehicle 106 may enter the asset area 102 via an ingress point, but it may not have been previously tagged with identifying means. In this case, the one or more ingress detectors 104 may generate a signal to indicate that a non-identified object has entered the asset area 102. In certain example implementations, such a signal may be utilized to alert personnel to install identification on the asset. In certain example implementations, a signal signifying the detected entry of a non-identified asset may be utilized to start tracking (via images received from the one or more cameras 114, 116) the entering and non-identified object as it traverses within the asset area 102. In other example implementations, the images received from the one or more image capture devices 114, 116 may be utilized by the system to start the tracking of a non-identified object without requiring any signal from the ingress detectors 104.

With continued reference to the method flow diagram of FIG. 5, and in block 504, the method 500 includes receiving, from one or more image capture devices 116, 118 positioned to view respective portions of the asset area 102, data indicative of a plurality of captured images.

In block 506, the method 500 includes performing, by at least one processor, object classification of the first object based on one or more of: the ingress indication, at least one of the plurality of captured images, and an identification signal detected by the ingress detector. For example, when a vehicle 106 that has been previously tagged with identification (such as an RFID tag, QR code, etc.) enters the asset area 102, the ingress detectors 104 may read the identification and obtain sufficient classification information so that computer vision recognition is not required. However, in certain example implementations, such classification information received from the ingress detectors 104 may be utilized with images received from the one or more image capture devices 116, 118 to train and/or refine a classification model associated with the neural network 212. According to certain example implementations, if the tag read by the ingress detectors 104 provide sufficient classification information, the one or more image capture devices may be utilized to for the primary purpose of tracking the position of the object.

In block 508, the method 500 includes determining a first object location of the first object based at least in part on the object classification. In block 510, the method 500 includes outputting an indication of the first object location.

According to an example implementation of the disclosed technology, determining the first object location may be based on the angle, altitude, and/or azimuth of one or more image capture devices 116, 118 relative to a flat ground plane plus the initial GPS coordinates. In accordance with certain example implementations of the disclosed technology, a trigonometric projection may be utilized to map particular pixels in the corresponding image(s) to GPS coordinates relative to the image capture device position. For cases where more complicated terrain or objects exist, further preprocessing may be performed to determine the projection(s).

Certain example implementations of the disclosed technology can include tracking the first object location in the respective portions of the asset area, for example, by: processing image frames received from a first image capture device of the one or more image capture devices when the first object is in a first portion of the asset area, and processing image frames received from a second image capture device of the one or more image capture devices when the first object is in a second (and different) portion of the asset area.

Certain example implementations of the disclosed technology can include receiving, at the at least one processor, a GPS coordinate; determining a corresponding coordinate of the first object based on the received GPS coordinate and the tracked first object location; and outputting a corresponding coordinate as the output indication of the first object location.

In accordance with certain example implementations of the disclosed technology, a location of an object may be tracked and/or estimated using one or more image capture devices. For example, when two cameras are positioned to view an asset area from different angles, and when there is overlap in respective fields of view of the cameras, the position of a target object (such as a vehicle) within each respective field of view may be represented by respective vectors in respective 2-D coordinate system defined by each camera's image output dimensions, which in certain example implementations, may be defined by the number of horizontal and vertical pixels of the camera's CCD sensor. In an example implementation, the target object's position may be estimated by projecting each respective 2-D vector onto a 3-D coordinate system defined at least in part by the difference in view angles of the two cameras, with absolute location referencing tied to a known coordinate of at least one fixed landmark in the field of view, or associated with a known position of one or more of the cameras.

In another example implementation, and as may be applied when a target object (such as a vehicle) is in a field of view of only one image capture device, a predefined grid or vector template may be referenced to estimate the object's position. In certain example implementations, parking spot designations or lines may be utilized as a defined grid for which to reference the object's position.

Certain example implementations of the disclosed technology can include associating, at a registration point, identification information with the first object responsive to the ingress indication.

Certain example implementations of the disclosed technology can include determining one or more classification scores using a trained neural network processing engine.

Certain example implementations of the disclosed technology can include outputting a corresponding GPS coordinate as the output indication of the first object location. As discussed herein, the plurality of captured images can include a corresponding plurality of different views of the first object including but not limited to: different lighting, different perspectives, different contrast, different brightness, and different size.

According to an example implementation of the disclosed technology, a single computer vision model may encapsulate different processes, operations, and/or outcomes to provide distinct, independent probabilities based on different features of the tracked object. For example, in the scenario of the vehicle identification, a single computer vision model may provide one matching score for vehicle make/model, one matching score for vehicle model/trim, and one matching score for vehicle year. According to an example implementation, an aggregate score may be output based on the individual feature scores. Certain implementations may provide the aggregate score based on a sum of the individual feature scores. In certain example implementations, the aggregate score may be based on weighted individual feature scores. For example, it may be beneficial to assign a higher weight to the vehicle model/trim score compared with the vehicle year score for certain vehicles, particularly if certain related features remain substantially constant from year-to-year for a particular vehicle.

While each of the computer vision feature scoring functions, as discussed above, may be broken out into separate files and/or loaded and/or operated independently, certain example implementations of the disclosed technology may encapsulate the various computer vision feature scoring functions into the same computer vision model file, for example, to improve performance, stability, and/or speed of the object recognition process.

According to an example implementation of the disclosed technology, different computer vision model files (with or without corresponding encapsulated feature scoring functions) may be selected for download (and/or automatically loaded) into memory of the asset location server 204 and/or associated computer vision module 210. For example, a system in a certain region or country may download (and/or may be presented with the option of downloading) a computer vision model file that is specifically trained to recognize assets that are likely to be present in the asset area. Such embodiments may provide technical benefits reducing the file size of the computer vision model file, allow customization for particular computer vision applications, improve performance, improve stability, and improve speed of the object recognition process.

In certain example implementations, the computer vision model file may be modularized to perform specific recognition functions for a selected subset of objects and/or features. In one example implementation, a computer vision model may be utilized to distinguish/classify whether an object image is (or is not) a particular object. In the case of vehicle identification, the computer vision model may perform the modularized recognition process for a set of captured images to indicate whether they correspond to a particular selected vehicle make/model/year.

Certain implementations may include applying weighting to one or more of the plurality of classification scores. Certain example implementations can include preprocessing one or more of the captured image frames. In an example implementation, applying the weighting may be based at least in part on preprocessing. According to an example implementation of the disclosed technology, temporal weighting may be utilized to preferentially weight newer captured images. In certain example implementations, temporal weighting may be utilized to preferentially weight older captured images. According to certain example implementations, preprocessing can include adjusting one or more of brightness, contrast, hue, and sharpness associated with one or more of the plurality of captured image frames.

As disclosed herein, the accumulation and/or weighting of classification scores for multiple input images of an object can provide the technical effect of increasing recognition accuracy compared to the recognition accuracy of a single input image. Certain example implementations may provide the technical effect of increasing recognition accuracy of an object. In certain instances, the recognition accuracy can be increased by up to 2%. In certain example implementations, the recognition accuracy can be increased by up to 10%. In certain example implementations, the recognition accuracy can be increased by up to 20%. In certain example implementations, the recognition accuracy may depend on factors such as image quality, the number of distinct views of the object represented in the plurality of images, the quality of trained computer vision model(s), etc.

Certain example implementations of the disclosed technology may utilize artificial neural networks to process input image frames, for example, by classifying the input image frames by probable match with one or more trained computer vision models. In certain example implementations, a set of input values and associated weights may be derived from certain features of the input image frames. In accordance with certain example implementations of the disclosed technology, a function may sum the weights and map the results to an output.

In certain example implementations, neurons associated with the neural network may be organized into layers: input, hidden and output. The input layer may include values that are inputs to the next layer of hidden neurons. Several hidden layers can exist in one neural network. The final layer may be the output layer and may include one node for each class. In certain example implementations of the disclosed technology, a sweep forward through the network may result in an assignment of a value to each output node, and the input image may be assigned to the class node with the highest value.

In the training phase, the correct class (for example, vehicle make/year/model) for each object may be known via supervised training, and the output nodes can be assigned correct values, such as "1" for the node corresponding to the correct class, and "0" for the others. Certain example implementations of the disclosed technology may compare the network's calculated values for the output nodes to the correct values to calculate an error term for each node. The error terms may be utilized to adjust the weights in the hidden layers so that, during the next iteration the output values will be closer to the correct values.

One feature of neural networks, as disclosed herein, is an iterative learning process that may be utilized to train the computer vision model(s). For example, training images may be presented to the network one at a time, and the weights associated with the input values may be adjusted. After all training images are presented, the process may be repeated to refine the computer vision model training. In one example implementation of the disclosed technology, and during this learning phase, the network may be trained by adjusting the weights to predict the correct classification label of input images. Advantages of neural networks include their high tolerance to noisy data, as well as their ability to classify patterns on which they have not been trained.

In certain example implementations, the neural network may process the training images one at a time, using the weights and functions in the hidden layers. The resulting outputs may then be compared against the desired outputs. In certain example implementations, errors may be propagated back through the network to adjust the weights for application to the next training image. During the training of a network, the same set of training data may be processed many times as the connection weights are continually refined. In certain example implementations, a recursive neural network may be utilized during training and/or during the recognition process. For example, a recursive neural network may utilize classification informaton from a set of images to adjust classification for a single image.

Certain example implementations of the disclosed technology may utilize neural networks that are pre-trained for particular subsets of objects (such as vehicles, buildings, monuments, etc.). Once the network has been trained, it may receive one or more image frames of an object as input to the neural network. The neural network may process the input image and assign value to each output node. The input image frame may be assigned to a classification with the highest value and/or best match to a particular trained object.

According to an example implementation of the disclosed technology, other machine learning techniques (besides and/or in addition neural networks) may be iteratively trained in a similar process as described above and utilized for object detection and/or classification.

For the purposes of tracking, and according to certain example implementations, an object detection system may be utilized to predict classes and to also determine bounding boxes for an object in an image. Certain example implementations of the object detection system may simultaneously classify multiple objects and their associated bounding boxes, for example, to track the location of each object. Certain example implementations of the disclosed technology may utilize state-of-the-art object detection CNN architectures such as YOLO (You Only Look Once) and/or SSD (Single-Shot Detection). SSD, for example, is an approach that can convert an image recognition architecture into an object-detection framework, which can result in SSD-VGG or SSD-Inception networks.

The systems and methods disclosed herein may take advantage of modern computer architecture for significant improvements in object recognition. As used in this application, the terms "component," "module," "system," "server," "processor," "memory," and the like are intended to include one or more computer-related modules, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation. This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXEMPLARY USE CASES

In certain example implementations, a computer vision module may receive a plurality of image frames from one or more image capture devices positioned to monitor assets in an asset area. The computer vision module may utilize a trained neural network and associated models for distinguishing certain objects among a plurality of objects. In certain example implementations, an asset location server may include the computer vision module and an executable software program configured to process the plurality of input images of an object of interest. The images may be classified based on matching features with the pre-trained computer vision model. The positions of distinguished objects may be tracked by determining their associated location from frame to frame.

In one exemplary use case, a user may be shopping for a vehicle, and may be walking around a dealer lot (e.g., asset area 102) attempting to find a certain vehicle among a plurality of other vehicles 101 or assets. The user may access the dealer's inventory web application with their mobile computing device (e.g., mobile computing device 218), search for the certain vehicle of interest, and receive (e.g., via asset tracking system 200) detailed directions on where the certain vehicle is currently located. In certain example implementations, information received (in addition to the location information) can include: make, model number, year, features, comparative pricing, etc.

Certain example implementations of the disclosed technology may utilize location information (such as GPS coordinates, geofencing, etc.) to provide additional information. For example, a GPS receiver on the user's mobile computing device 218 may be utilized to determine an approximate location of the user for refined directions to a certain vehicle. In the example use case scenario where the user is located at a vehicle dealership lot (e.g., asset area 102), the user's location may be utilized to present information about vehicles 101 that are closest to the user. In another example scenario, signage, QR codes, barcodes, emblems, and/or other identifying features near or attached to a vehicle may be utilized to enhance object recognition and/or to identify a particular vehicle with high confidence. In certain example implementations, the object recognition information may be utilized to retrieve additional detailed information about a certain vehicle, including but not limited to: the vehicle location, dealer's price for the vehicle, history of the vehicle, financing terms, etc.

The disclosed technology may leverage video/image capturing capabilities of relatively inexpensive video cameras (e.g. image capture devices 114, 116), while providing one or more pre-trained computer vision models and neural network classification software that may enable image capturing, classification, and output of positional information.

In another use case, video information received from the one or more image capture device 114, 116 may provide additional security system functions, for example, to monitor the asset area(s) 102, record video, detect intruders, turn on lights when movement is detected at night, etc. In an example implementation, the system may be utilized to document a condition of an asset at a first time and a second time to provide a time-stamped record of when damage may have occurred. For example, a customer may damage a vehicle during a test drive and attempt to claim that the damage was already present on the vehicle before the test drive. Saved images or video may provide proof of the before- and after-condition of the asset.

In another example use case, the systems and methods provided herein may be utilized in car rental facilities to enable tracking of vehicles as discussed herein, and to also provide a record of the vehicle condition at the start and end of a rental period as an enhanced method for documenting damage to the vehicle during a rental period.

What is claimed is:

1. An image-based system for object tracking within an asset area, comprising:
   one or more image capture devices positioned to view respective portions of the asset area;
   an ingress detector;
   at least one processor in communication with the one or more image capture devices and the ingress detector;
   a memory in communication with the at least one processor and storing instructions that, when executed by the at least one processor, are configured to cause the at least one processor to:
      receive, from the ingress detector, an ingress indication of a first object entering the asset area;
      receive, from at least one of the one or more image capture devices, data indicative of a plurality of captured images;
      classify, responsive to the ingress indication, the first object as having a first classification of a plurality of classifications using one or more of at least one of the plurality of captured images and an identification signal detected by the ingress detector;
      track, based on the first classification, a first object location of the first object; and
      output, based on the first classification, an indication of the first object location.

2. The system of claim 1, wherein the instructions are further configured to cause the at least one processor to track the first object location in the respective portions of the asset area by:
   processing one or more captured images received from a first image capture device of the one or more image capture devices when the first object is in a first portion of the asset area; and
   processing one or more captured images received from a second image capture device of the one or more image capture devices when the first object is in a second portion of the asset area, wherein the first portion of the asset area and the second portion of the asset area are non-overlapping.

3. The system of claim 1 further comprising a GPS detector coupled with at least one of the one or more image capture devices, wherein the instructions are further configured to cause the at least one processor to:
   receive a GPS coordinate from the GPS detector;
   determine a corresponding GPS coordinate of the first object based on the tracked first object location; and
   output a corresponding GPS coordinate as the output indication of the first object location.

4. The system of claim 1, wherein the instructions are further configured to cause the at least one processor to:
   receive a GPS coordinate;
   determine a corresponding GPS coordinate of the first object based on the tracked first object location; and
   output a corresponding GPS coordinate as the output indication of the first object location.

5. The system of claim 1, wherein the first object is a vehicle and the asset area is a car dealership lot.

6. The system of claim 1 further comprising a registration station configured to associate identification information with a new object entering the asset area, wherein the registration station comprises one or more of an RFID detector, a motion detector, an optical interrupt detector, a barcode reader, and a two-dimensional barcode (QR-code) reader.

7. The system of claim 1 further comprising an egress detector, wherein one or more of the egress detector and the ingress detector comprise one or more of an RFID detector, a motion detector, an optical interrupt detector, a barcode reader, and a two-dimensional barcode (QR-code) reader.

8. The system of claim 7, wherein the egress detector and the ingress detector are co-located.

9. The system of claim 1, wherein one or more of the ingress detector, the one or more image capture devices, the at least one processor, and the memory are retrofitted to the system.

10. The system of claim 1 further comprising a security system configured to record a series of images based on receiving the ingress indication.

11. The system of claim 1, wherein the instructions are further configured to cause the at least one processor to determine one or more conditions of the first object at a first time and at a second time.

12. The system of claim 1, wherein classifying the first object further comprises:
   accumulating a plurality of classification scores for the first object to determine an accumulated score; and
   outputting the first classification of the first object responsive to one or more of a timeout and the accumulated score exceeding a predetermined threshold.

13. The system of claim 12 further comprising a trained neural network processing engine, wherein the instructions are further configured to cause the at least one processor to modify one or more of the plurality of classification scores.

14. A method comprising:
   receiving, from an ingress detector, an ingress indication of a first object entering an asset area;
   receiving, from one or more image capture devices positioned to view respective portions of the asset area, data indicative of a plurality of captured images;
   performing, by at least one processor, object classification of the first object based on one or more of: the ingress indication, at least one of the plurality of captured images, and an identification signal detected by the ingress detector;
   determining a first object location of the first object based at least in part on the object classification; and
   outputting an indication of the first object location.

15. The method of claim 14, further comprising tracking the first object location in the respective portions of the asset area by:
   processing image frames received from a first image capture device of the one or more image capture devices when the first object is in a first portion of the asset area; and
   processing image frames received from a second image capture device of the one or more image capture devices when the first object is in a second portion of the asset area, wherein the first portion of the asset area and the second portion of the asset area differ.

16. The method of claim 14, further comprising:
   receiving, at the at least one processor, a GPS coordinate;

determining a corresponding GPS coordinate of the first object based on the tracked first object location; and outputting a corresponding GPS coordinate as the output indication of the first object location.

17. The method of claim 14, further comprising associating, at a registration point, identification information with the first object responsive to the ingress indication.

18. The method of claim 14, further comprising determining one or more classification scores using a trained neural network processing engine.

19. A non-transitory computer readable storage medium storing instructions for use with an image-based object tracking system, wherein the instructions are configured to cause the system to perform a method comprising:

receiving, from an ingress detector, an ingress indication of a first object entering an asset area;

receiving, from one or more image capture devices positioned to view respective portions of the asset area, data indicative of a plurality of captured images;

performing, by at least one processor, object classification of the first object based on one or more of: the ingress indication, at least one of the plurality of captured images, and an identification signal detected by the ingress detector;

determining a first object location of the first object based at least in part on the object classification; and outputting an indication of the first object location.

20. The non-transitory computer readable storage medium of claim 19, further comprising:

receiving, at the at least one processor, a GPS coordinate;

determining a corresponding GPS coordinate of the first object based on the tracked first object location; and outputting a corresponding GPS coordinate as the output indication of the first object location.

* * * * *